Figure 1:
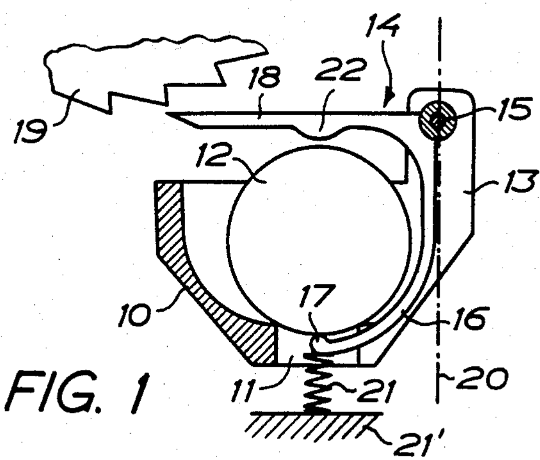

United States Patent [19]

Sylvén

[11] Patent Number: 4,534,521

[45] Date of Patent: Aug. 13, 1985

[54] INERTIA SENSOR IN BELT REELS FOR VEHICLE BELTS

[76] Inventor: Hans C. Sylvén, Reimers gata 10, S-447 00 VÅrgÅrda, Sweden

[21] Appl. No.: 650,332

[22] Filed: Sep. 13, 1984

Related U.S. Application Data

[63] Continuation of Ser. No. 574,936, Jan. 27, 1984, abandoned, which is a continuation-in-part of Ser. No. 403,746, filed as PCT SE 81/00 355 filed Feb. 7. 1981, published as WO 82/02000 Jun. 24, 1982, § 102(e) date Jul. 29, 1982, abandoned.

[30] Foreign Application Priority Data

Dec. 8, 1980 [SE] Sweden ............................... 8008590

[51] Int. Cl.[3] ............................................ B65H 75/48

[52] U.S. Cl. ............................................ 242/107.4 A

[58] Field of Search ................ 242/107.4 A; 280/806; 297/478

[56] References Cited

U.S. PATENT DOCUMENTS

| | | | |
|---|---|---|---|
| 3,944,164 | 3/1976 | Tibbe | 242/107.4 A |
| 4,176,809 | 12/1979 | Thomas et al. | 242/107.4 A |
| 4,253,621 | 3/1981 | Seel | 242/107.4 A |
| 4,262,858 | 4/1981 | Takada | 242/107.4 A |

FOREIGN PATENT DOCUMENTS

| | | | |
|---|---|---|---|
| 2429801 | 1/1976 | Fed. Rep. of Germany . | |
| 2530006 | 1/1976 | Fed. Rep. of Germany . | |
| 2553776 | 10/1976 | Fed. Rep. of Germany . | |
| 2802030 | 7/1979 | Fed. Rep. of Germany | 242/107.4 A |
| 329096 | 9/1970 | Sweden . | |
| 76113984 | 10/1976 | Sweden . | |
| 412008 | 2/1980 | Sweden . | |

*Primary Examiner*—Stuart S. Levy
*Assistant Examiner*—Lloyd D. Doigan

[57] ABSTRACT

Inertia sensor in belt reels for vehicle belts comprising a rolling body (12) carried on a support (10), and a transmission element (14) for operative interaction with the latch mechanism of the belt reel. This transmission element comprises a double-arm lever (16, 18) which surrounds the rolling body and is resiliently biased, so that one arm (16) will engage the lower side of the rolling body, the transmission element thus being adjustable under the bias thereof at movement of the rolling body from a rest position on the support. The other arm (18) normally is spaced from the upper side of the rolling body and is arranged to actuate the latch mechanism by such adjustment. At delayed movement of the transmission element under the bias thereof the rolling body will engage said other arm to actuate the latch mechanism.

7 Claims, 4 Drawing Figures

14
18
22
15
19
12
13
10
17
16
11
21
20
21'

14
15
18
22
19
12
13
10
17
16
11
21
21'

14
15
18
22
19
12
13
10
17
16
11
21
21'

INERTIA SENSOR IN BELT REELS FOR VEHICLE BELTS

This is a continuation of application Ser. No. 574,936, filed Jan. 27, 1984, which in turn is a continuation of Ser. No. 403,746, filed as PCT SE 81/00355 filed Feb. 7, 1981, published as WO 82/02000 Jun. 24, 1982, § 102(e) date July 29, 1982, both now abandoned.

The invention relates to an inertia sensor in belt reels for vehicle belts comprising a rolling body on a support and a transmission element for operative interaction with the latch mechanism of the belt reel, the transmission element being adjustable so as to actuate the latch mechanism due to movement of the rolling body from a rest position on the support.

A sensor of this type can be either active or passive. If it is active, the rolling body when moving from the rest position will actuate by inertia the transmission element, the latter being displaced against an external force, e.g. a spring force, biasing the transmission element. In a passive sensor, however, the transmission element is retained, under the influence of the rolling body, against the external force, when the rolling body is in its rest position, and then when the rolling body moves from the rest position it releases the transmission element so that movement can then be imparted to said element under the bias of the external force.

Usually the rolling body comprises a ball which rolls from its rest position on the support when the vehicle is being retarded or is inclined in any arbitrary direction. Over the transmission element, the sensor brings the latch mechanism of the belt reel into the locking position in the event of a predetermined retardation, or inclination of the vehicle beyond a predetermined angle, and this can be effected purely mechanically or via an electrical circuit.

Sensors of both the active and passive types are available on the market in experienced designs. Both types have proved to comply with extremely stringent requirements regarding functional reliability. However, the passive sensor is more advantageous than the active one, because the actuation of the transmission element is less sensitive in respect of dust and corrosion, which in the active sensor can cause an increase in friction between the rolling body and the transmission element, and thus cause a reduction in sensor sensitivity. On the other hand in the case of the passive sensor, a failure of the means providing the external force on the transmission element can result in the sensor becoming non-functioning, and also in the case of this sensor the sensitivity can be reduced or the operation can be jeopardized as a result of dust or corrosion causing increased friction in the bearing of the transmission element, even though the risk of this is quite slight.

The object of the present invention is to provide an inertia sensor of the type referred to above with further improved reliability, and this object is achieved by providing a sensor having the characteristics defined in claim 1.

Figure 2:
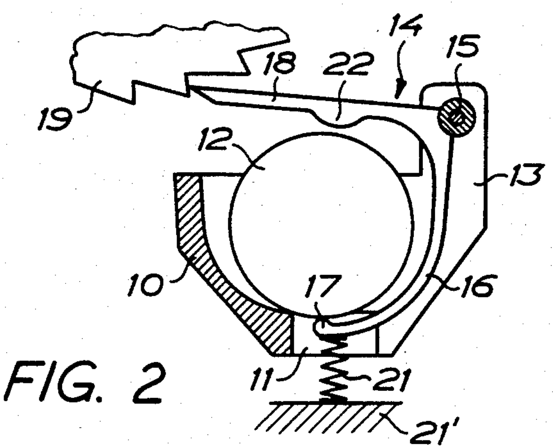
Figure 3:
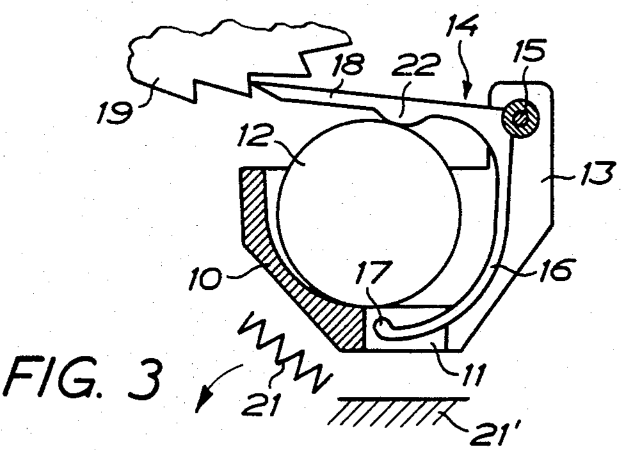
Figure 4:
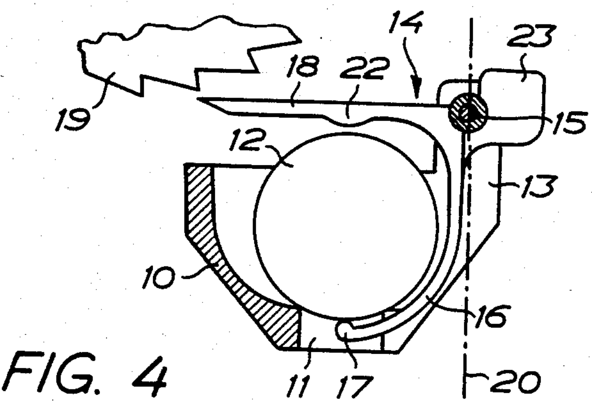

In order to illustrate the invention reference is made to the accompanying drawings which show embodiments of the sensor in accordance with the invention. In the drawings:

FIG. 1 is a vertical sectional view of the sensor in one embodiment thereof, the rolling body being shown in the rest position, FIG. 2 is a view corresponding to FIG. 1, the rolling body being displaced from the rest position with the sensor operating normally, FIG. 3 is a view corresponding to FIG. 1, the rolling body being displaced from the rest position in the case wherein the sensor has become non-functioning as a passive sensor, and FIG. 4 is a vertical sectional view of the sensor in another embodiment thereof, the rolling body being shown in the rest position.

The sensor shown in FIGS. 1 to 3 comprises a support in the form of a spherical seat 10 with a through cylindrical bottom opening 11. A ball 12 which comprises the rolling body of the sensor rests in the spherical seat. This ball normally adopts a rest position centrally in the spherical seat, and this position is defined by the ball being supported by the edge of the opening 11 inside the spherical seat.

A transmission element 14 is rotably mounted on a cross pin 15 in a slot 13 in the spherical seat. This transmission element comprises an actuating arm 16 which at the preferably spherically rounded end 17 thereof can be engaged with the ball 12 on the lower side thereof in the opening 11, and a detent arm 18 which extends above the ball 12 to interact with a detent wheel 19 which forms part of the belt reel latch mechanism for locking the belt against withdrawal from the belt reel. The arms 16 and 18 thus form a bell crank which surrounds the ball 12, the arms being positioned below and above the ball, respectively, the bell crank being located on one side of a vertical plane through the bearing pin 15, which is marked by a dash and dot line 20 in FIG. 1.

A spring, in this case a helical compression spring 21, is engaged between the arm 16 and a fixed support 21' so that normally the transmission element will be engaged with the lower side of the ball 12 at the end 17 of the arm 16, as shown in FIG. 1. Then, the arm 18 is disengaged from the detent wheel 19, as is also shown in FIG. 1. This arm has a cam protrusion 22 on the lower side thereof, facing towards the ball 12, and in the position of the arm 18 shown in FIG. 1 this protrusion is spaced from the surface of the ball.

When the sensor is mounted in the vehicle, the ball 12 will roll from the rest position shown in FIG. 1 if the vehicle should be retarded or inclined in any direction, and this means that the operative state as shown in FIG. 2 is obtained. At the end 17 of the arm 16 the transmission element 14 is kept engaged with the ball 12 by the spring 21 during movement of the ball from the rest position, and the result thereof is that the transmission element biased by the spring 21 swings in the clockwise direction, as seen in the drawing, due to the movement of the ball from the position in FIG. 1, e.g. to the position shown in FIG. 2, in which the arm 18 is engaged with the detent wheel 19. There is still a space between the protrusion 22 on the arm 18 and the ball 12, and as will be understood, this means that the sensor is of the passive type in accordance with the definition given above. The detent wheel 19 can form part of a latch mechanism of the type in which this detent wheel does not carry a load but, when the rotary movement thereof is stopped by means of the arm 18, causes engagement between the load carrying elements of the latch mechanism. Hence, in the locking position the arm 18 will be subjected only to a slight load and can be dimensioned with due consideration thereof. The way in which such a latch mechanism is constructed and operates is well known in the art and hence need not be described in greater detail here.

If it should occur that the spring 21 drops away, breaks or has never even been installed, so that the transmission element is not rotated when the ball 12 moves from the rest position thereof, it could occur that the movement required to lock the belt reel is not imparted to the transmission element. In the sensor illustrated and described with reference to FIGS. 1 to 3, the ball 12 will then come into contact with the protrusion 22 as shown in FIG. 3 and then, by inertia, will displace the transmission element which is rotated, so that in this case too the arm 18 will engage the detent wheel 19. This is illustrated in FIG. 3, where in the position shown the protrusion 22 of the transmission element engages the ball 12 on the top side thereof, whilst on the other hand there is a space between the end 17 of the arm 16 and the ball on the lower side thereof. As can easily be seen, under these conditions the sensor operates as an active sensor, which provides a double security that the sensor will react in a critical situation when the ball is displaced from the rest position thereof as a result of vehicle retardation or inclination.

In the embodiment shown in FIG. 4, the spring 21 is replaced by a mass 23 forming part of the bell crank 14. This mass is located on the side of the vertical plane 20 opposite to the arms 16 and 18 and the mass is dimensioned such that the bell crank is biased to engage the lower side of the ball 12 at the end 17 of the arm 16. All other elements and parts of the embodiment of FIG. 4 are identical with those of the embodiment of FIGS. 1 to 3 and have been provided with the same reference numerals.

If the transmission element jams on the bearing pin 15 due to dust or corrosion such that the mass 23 will not be able to rotate the transmission element 14 so as to engage the detent arm 18 with the detent wheel 19 when the ball 12 is displaced from the rest position thereof shown in FIG. 4, then the ball will engage the protrusion 22 of the arm 18 in the manner shown and described with reference to FIG. 3.

As can be seen the sensor in accordance with the invention is very simple as to the design thereof and includes only two moving components, the ball 12 and the transmission element 14. In the embodiment illustrated the detent arm 18 interacts directly with detent wheel 19, but it is also possible, as is known per se, to allow this arm to control an electrical circuit by way of which the detent mechanism is actuated.

I claim:

1. An inertia sensor in a belt reel for a vehicle belt for actuating a latch mechanism whether or not a bias means operatively connected with the sensor is functional, and functioning both as a passive and as an active sensor, comprising, in combination:

(a) a belt reel having a latch mechanism;

(b) a transmission element in the form of a double-arm lever with a first lever arm movable between an at-rest position and an actuating position, for operative interaction with the latch mechanism, to move it into a reel-latching position;

(c) a support for a rolling body;

(d) a rolling body carried on the support, normally in an at-rest position, and movable thereon between at-rest and lever arm-actuating positions;

(e) the double-arm lever being adjustable so that the first lever arm actuates the latch mechanism when the rolling body is in the actuating position;

(f) the lever extending around the rolling body in such a manner that a second lever arm engages and is retained by the lower side of the rolling body whenever the rolling body is in the at-rest position, and the first lever arm is positioned above the rolling body, with a lever arm fulcrum positioned therebetween;

(g) bias means biasing the first lever arm into the latch-actuating position whenever the second lever arm is released by the rolling ball, in moving from the at-rest into the actuating position, and in the at-rest position biasing the first lever arm into a position spaced from and above the rolling body, but still in a position to be engaged by the rolling body, in the event of nonfunctioning of the bias means, whenever the body moves from the at-rest to the actuating position;

(h) the first lever arm whenever the bias means does not bias the first lever arm into the actuating position being engaged by the rolling body and moved by the rolling body into the latch-actuating position, whenever the body moves from the at-rest to the actuating position; whereby, whether or not the bias means is functional, upon movement of the rolling body from the at-rest into the actuating position the first lever arm is moved into a position in which it actuates the latch mechanism.

2. Inertia sensor as claimed in claim 1 in which the bias means is a spring.

3. Inertia sensor as claimed in claim 1 in which the bias means is a weight.

4. Inertia sensor as claimed in claim 3 in which the weight is located on one side of a vertical plane containing the fulcrum axis of the double-arm lever, the rolling body and at least the major weight of the lever arm as the first lever arm being located on the other side of said vertical plane, so that the first lever arm falls against the rolling body when the bias means is nonfunctional.

5. Inertia sensor as claimed in claim 1 in which the rolling body is a ball.

6. Inertia sensor as claimed in claim 5 in which the double-arm lever is biased by a spring.

7. Inertia sensor as claimed in claim 5 in which the lever is biased by a weight.

* * * * *